United States Patent [19]

Bernardon et al.

[11] Patent Number: 5,151,277

[45] Date of Patent: Sep. 29, 1992

[54] RECONFIGURABLE FIBER-FORMING RESIN TRANSFER SYSTEM

[75] Inventors: Edward Bernardon, Bedford; Michael F. Foley, Cambridge, both of Mass.

[73] Assignee: The Charles Stark Draper Lab., Inc., Cambridge, Mass.

[21] Appl. No.: 675,819

[22] Filed: Mar. 27, 1991

[51] Int. Cl.⁵ ............................................... B29C 45/14
[52] U.S. Cl. .................... 425/112; 249/155; 249/161; 264/313; 425/127; 425/129.1; 425/394; 425/377
[58] Field of Search ................ 425/390, 394, 398, 89, 425/110, 112, 127, 129.1, 543, 544, 577, 388; 249/155, 158, 161; 264/102, 257, 258, 313, 316

[56] References Cited

U.S. PATENT DOCUMENTS

| | | | |
|---|---|---|---|
| 3,596,869 | 8/1971 | Humphrey | 249/155 |
| 4,731,144 | 3/1988 | Kommineni et al. | 249/155 |
| 4,808,362 | 2/1989 | Freeman | 264/257 |
| 4,890,235 | 12/1989 | Reger et al. | 264/313 |
| 4,943,222 | 7/1990 | Nathoo | 425/390 |
| 4,946,640 | 8/1990 | Nathoo | 425/390 |
| 5,032,206 | 7/1991 | Sigerist | 156/358 |
| 5,037,599 | 8/1991 | Olson | 264/316 |
| 5,108,532 | 4/1992 | Theih et al. | 425/388 |

FOREIGN PATENT DOCUMENTS

62-142628  6/1987  Japan .................................. 156/267

Primary Examiner—Jay H. Woo
Assistant Examiner—Robert B. Davis
Attorney, Agent, or Firm—Iandiorio & Dingman

[57] ABSTRACT

A reconfigurable fiber-forming resin transfer molding system including a sealed chamber with first and second spaced flexible diaphragms for holding a fiber workpiece and press and die mold surfaces for forming the fiber workpiece.

8 Claims, 9 Drawing Sheets

RECONFIGURABLE FIBER-FORMING RESIN TRANSFER SYSTEM

FIELD OF INVENTION

This invention relates to a reconfigurable fiber-forming resin transfer system.

BACKGROUND OF INVENTION

Composite materials formed of a fiber matrix plus a resin which may be thermoplastic or thermosetting, for example, are more and more attractive for use in a variety of manufactured goods, e.g. boats, tools, planes, sporting goods, building construction, because their stiffness and strength-to-weight ratios are better than many metals. However, composites are relatively expensive to fabricate especially when they take complex shapes. Fabrication costs can be further increased when there is a need to precisely orient the fibers in a predetermined direction. In one approach dry fiber or fabric is laid up by hand and then the resin is applied and cured. The dry fabric tends to be difficult to keep in position and the more complex the shape the more difficult and time consuming is the layup labor. The fiber can be purchased in pieces (prepreg) already impregnated with the resin which are easier to layup since they are slightly tacky and can be used in complex forming processes but are much more costly than the separate raw materials.

One attempt to use the less expensive raw materials, i.e. separate fiber and resin, and to cut labor costs uses a resin transfer molding machine. While the machine uses the less costly separate fabric and resin, it also requires expensive tooling to contain the fabric during the resin injection step. This tooling is shaped to the particular form desired for the end product composite and requires high volume production runs for amortization. In addition, the process still requires labor-intensive three-dimensional hand layup of the dry fabric in the tooling in preparation for the resin impregnation step. Since the fabric is dry there is added difficulty in laying it up. Fast forming processes which can be used with prepregs, such as press forming or diaphragm forming, may not be used with dry fabrics since they don't retain their shape after forming. In addition it is often difficult to obtain an even impregnation of the fiber with the resin when the fiber is in a complex shape.

SUMMARY OF INVENTION

It is therefore an object of this invention to provide a reconfigurable fiber-forming resin transfer molding system which both forms and impregnates the fabric.

It is a further object of this invention to provide such a reconfigurable fiber-forming resin transfer molding system which uses separate dry fabric and resin instead of expensive prepreg materials.

It is a further object of this invention to provide such a reconfigurable fiber-forming resin transfer molding system which can form fabric which has been laid up in only two dimensions, thereby reducing labor costs and cycle time.

It is a further object of this invention to provide such a reconfigurable fiber-forming resin transfer molding system which can form in three-dimensional shapes but resin impregnates the fiber in two dimensions, which is easier and more controllable than impregnating three-dimensional shapes.

It is a further object of this invention to provide such a reconfigurable fiber-forming resin transfer molding system which reduces tool and labor costs.

It is a further object of this invention to provide such a reconfigurable fiber-forming resin transfer molding system which uses rapidly reconfigurable tooling that can be easily, quickly and inexpensively reconfigured for different shapes.

It is a further object of this invention to provide such a reconfigurable fiber-forming resin transfer molding system by actively manipulating the mold during the forming process to work the fiber into more complex shapes than possible with a forming process that relies on a solid tool.

It is a further object of this invention to provide such a reconfigurable fiber-forming resin transfer molding system which can compel impregnation through the fiber as well as across it.

It is a further object of this invention to provide such a reconfigurable fiber-forming resin transfer molding system which can differentially control the resin flow into the fiber in order to ensure uniform impregnation or to impose a predetermined non-uniform impregnation pattern.

The invention results from the realization that a truly reconfigurable fiber-forming resin transfer molding system can be achieved using low-cost, separate, dry fiber and resin by impregnating the fiber in a sealed chamber which encloses the fiber with flexible diaphragms so that the fiber can be formed as well as impregnated, and from the further realization that the sealed chamber can be employed with a reconfigurable press and die apparatus which can be rapidly reconfigured to form parts of different shapes.

This invention features a reconfigurable fiber-forming resin transfer molding system including a sealed chamber including first and second spaced flexible diaphragms for holding a fiber workpiece to be impregnated with resin; and means for introducing into the chamber the resin to impregnate the fiber workpiece.

In a preferred embodiment the sealed chamber may include a first frame for mounting the first diaphragm and a second frame for mounting the second diaphragm. The sealed chamber may also include sealing means between the frames and clamping means for tensioning the fabric workpiece held in the chamber. The means for introducing may include an inlet means and and outlet means. The inlet means may include a source of pressurized resin and the outlet means may include an outlet valve means. The inlet means may include a source of resin and an inlet valve means, and the outlet means may include a source of negative pressure. The system may further include a reconfigurable press and die apparatus, at least one of the press and die including a plurality of mold surface segments and means for individually selectively actuating the segments to configure a predetermined shape. Both the press and the die may include a plurality of mold surface segments and means for individually, selectively actuating the segments to configure a predetermined shape.

DISCLOSURE OF PREFERRED EMBODIMENT

Other objects, features and advantages will occur to those skilled in the art from the following description of a preferred embodiment and the accompanying drawings, in which.

Figure 1:
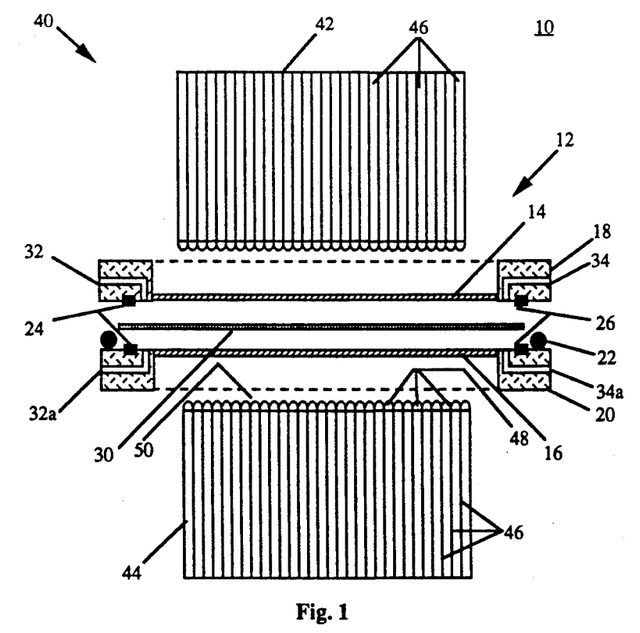
FIG. 1 is a side elevational schematic view of a reconfigurable fiber-forming resin transfer system according

There is shown in FIG. 1 a reconfigurable fiber-forming resin transfer system 10 according to this invention including a sealable chamber 12 which includes upper and lower flexible diaphragms 14 and 16, which can be made out of rubber or other elastomeric material and mounted in ridged frames 18 and 20, respectively. A peripheral O-ring seal 22 is provided to complete the seal of chamber 12 when frames 18 and 20 are brought together. Frames 18 and 20 may also include pairs of clamping pads 24 and 26 to grip the ends of fiber workpiece 30 and hold it taut, if that is desired. Resin is introduced through inlet or injection port 32 until it appears at outlet port 34, both ports being in upper frame 18 in order to take advantage of gravity in the flow of the resin material. Alternatively or additionally, injection ports 32a and outlet port 34a may be provided in lower frame 20.

Once chamber 12 has been sealed by the engagement of frames 18 and 20 with O-ring seal 22, and the resin has been injected, chamber 12 as a unit may be transferred to any forming means desired in order to form the fiber workpiece 30 by shaping the diaphragms 14 and 16 along with the fiber workpiece 30. Any standard tooling could be used to so form fiber workpiece 30, such as matched tooling or single-sided tooling with vacuum or pressure assists.

Figure 2:
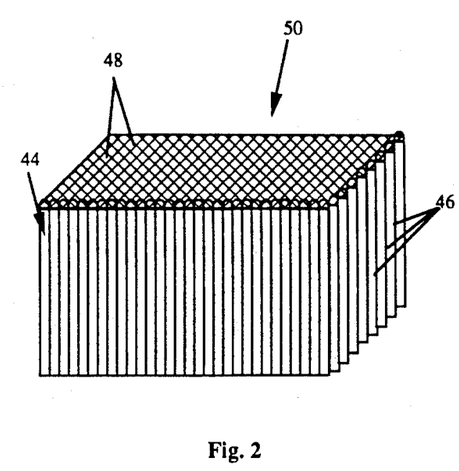
FIG. 2 is a schematic three-dimensional diagram of a portion of the reconfigurable press and die apparatus of FIG. 1.
Figure 3:
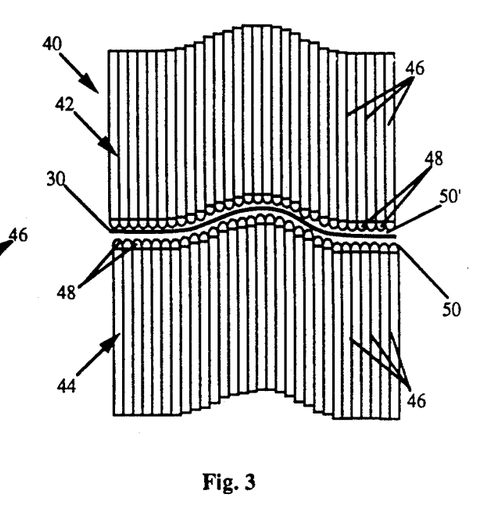
FIG. 3 is a side elevational schematic view of the press and die apparatus of FIG. 1 actuated to deform a fabric piece between them.

However, in accordance with another feature of this invention, sealed chamber 12 is used in conjunction with a press and die apparatus 40, including a press or upper tool 42 and a die or lower tool 44. Each of tools 42 and 44 include a three-dimensional matrix of actuatable elements 46 which are arranged in rows or columns, FIG. 2, and contain at their free ends individual segments 48 of the total tool surface 50. Elements 46 can be operated to extend and retract surface segments 48 to provide any desired surface configuration in order to correspondingly shape fiber workpiece 30, FIG. 3.

Figure 4:
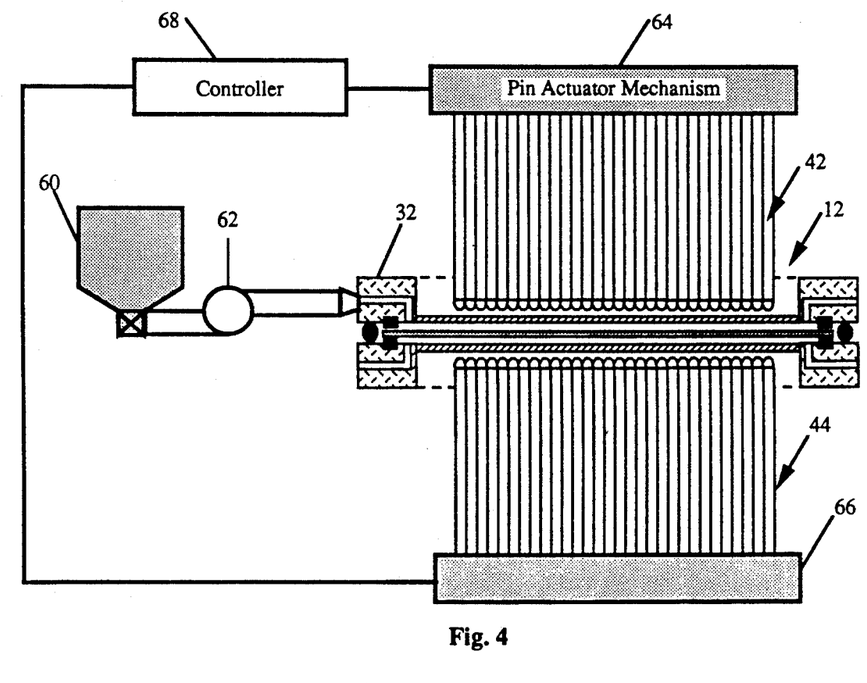
FIG. 4 is a view similar to FIG. 1 showing the actuator mechanisms, controlling computer, and resin supply with the sealed impregnation chamber in the closed position.
Figure 5:
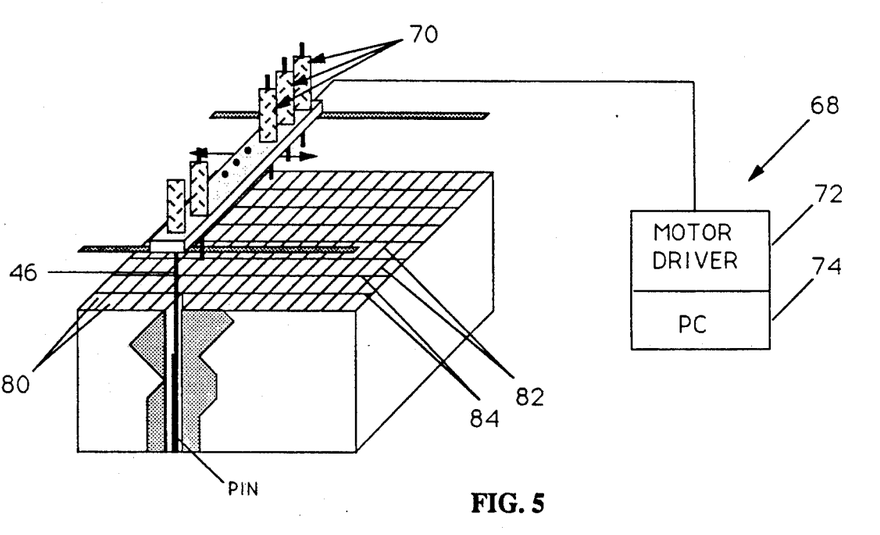
FIG. 5 is a three-dimensional schematic view of a mechanism for actuating the separate sections of the press and die.

Chamber 12 may have its inlet port 32, FIG. 4, connected to a resin supply including a hopper 60 and resin metering pump 62. Upper tool 42 and lower tool 44 may be actuated by pin driver mechanisms 64 and 66, respectively, through controller 68. Driver mechanisms 64 and 66 are identical and may be implemented, as shown in FIG. 5, by a plurality of positioning motors 70 such as stepper motors whose output shafts are lead screws connected to the individual elements 46. All of motors 70 are driven by motor driver 72 operated by computer 74, such as an IBM PC, in controller 68. Elements 46 are configured to fit in the spaces 80 defined by longitudinal 82 and lateral 84 spacer plates. A more detailed description of one such reconfigurable mold and drive mechanism is contained in "Design of an Automated Variable Configuration Die and Press for Sheet Metal Forming", by Robert Eric Robinson, a Master's thesis submitted to the Department of Mechanical Engineering in partial fulfillment of the requirements for the degree of Master of Science and Mechanical Engineering at the Massachusetts Institute of Technology, February 1987.

Figure 6:
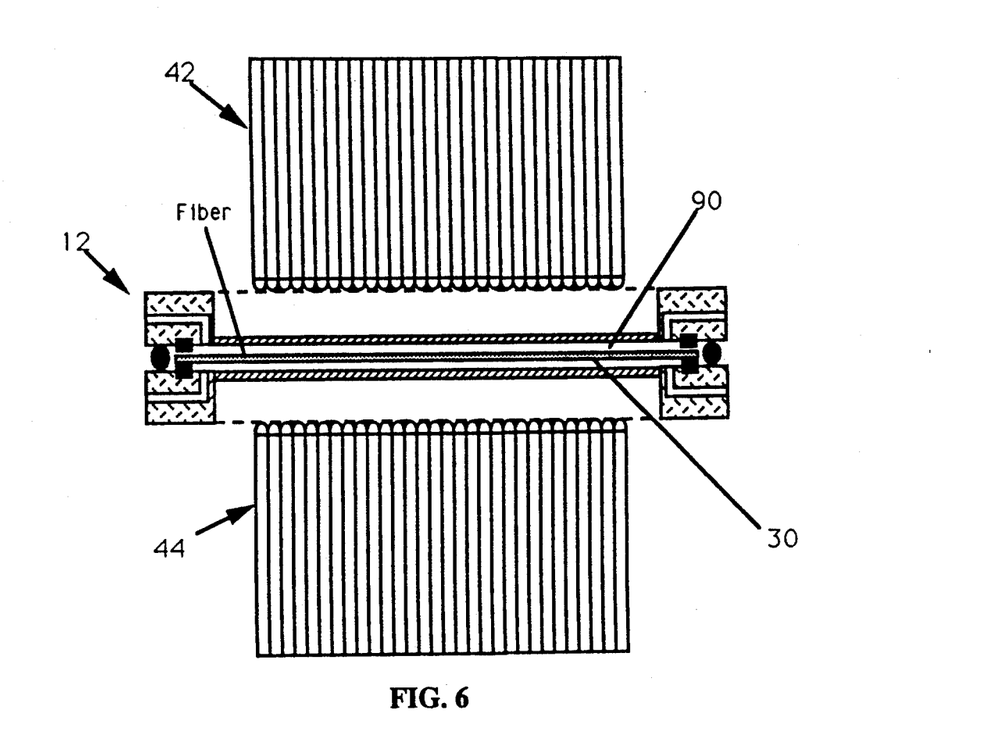
FIG. 6 is a partial schematic view of the sealed chamber and a portion of the press and die, with the press and die retracted for resin injection.
Figure 7:
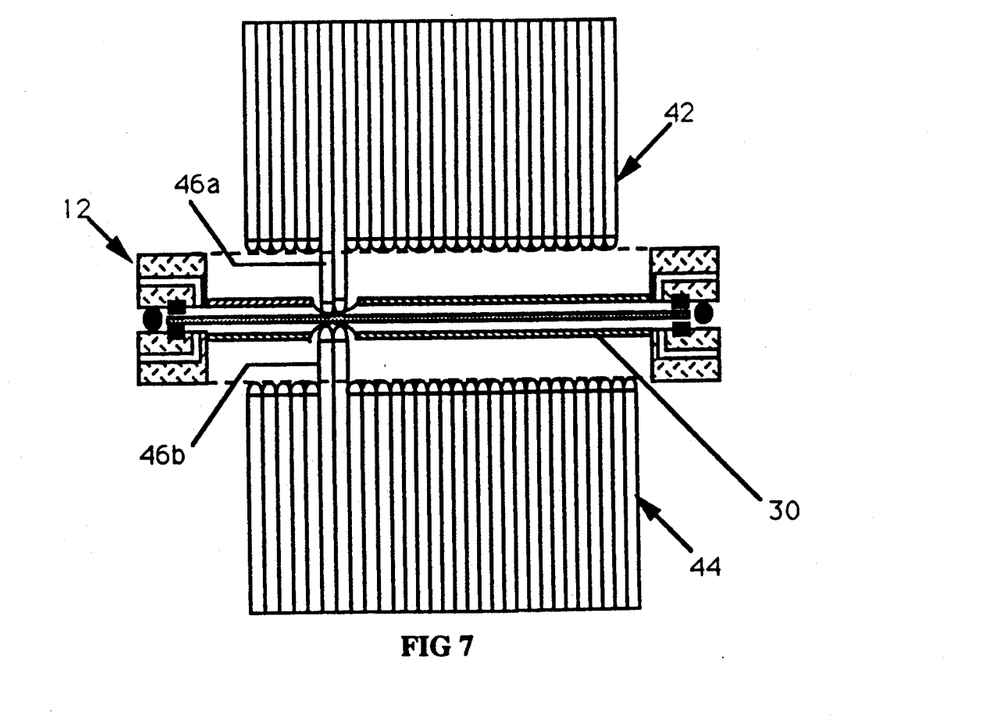
FIG. 7 is a view similar to FIG. 6 with certain portions of the press and die clamped on the fiber to maintain fiber orientation and/or control resin flow.
Figure 8:
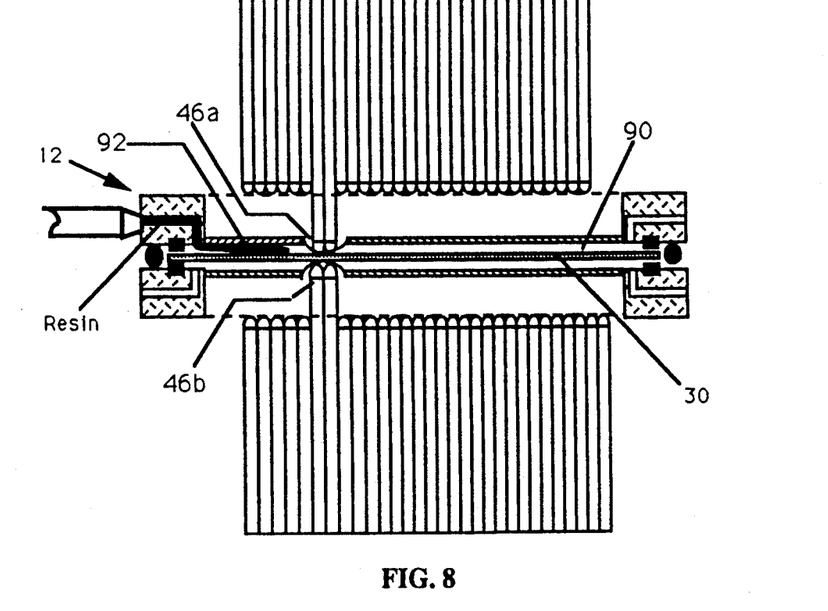
FIG. 8 is a view similar to FIG. 7 after the resin has been injected into the sealed chamber.
Figure 9:
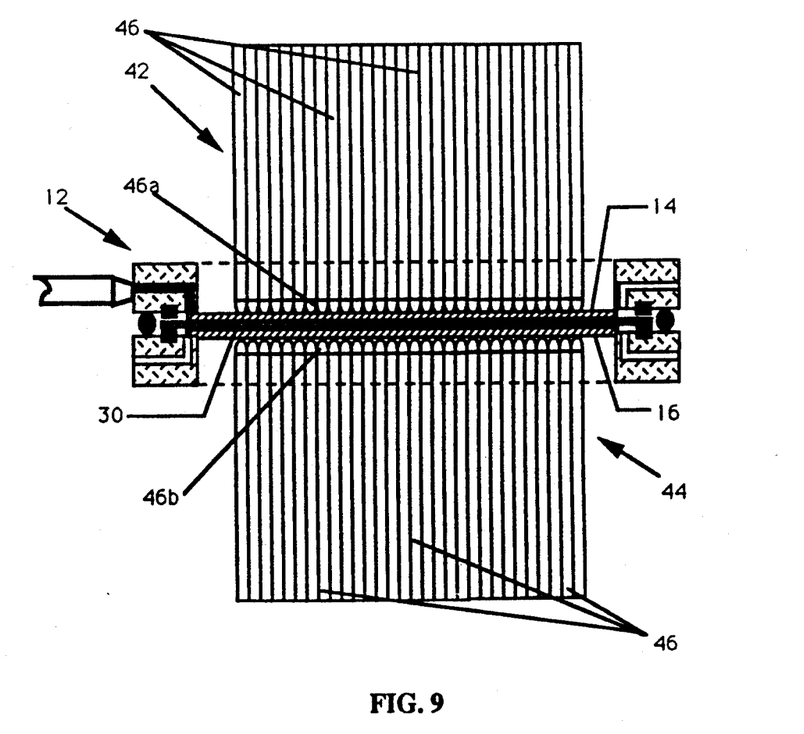
FIG. 9 is a view similar to FIG. 8 with all of the pins closed on the fiber in order to push the resin through it.

In operation, resin is introduced into the gap 90, FIG. 6, above fiber workpiece 30, and then selected elements 46a, 46b, FIG. 7, may be driven to move diaphragms 14 and 16 to engage a selected section of fiber workpiece 30 in order to hold the fibers in a fixed position during the fiber flow. Resin 92, FIG. 8, is then injected into gap 90' of chamber 12 while surface segments 46a and 46b remain engaged with fiber workpiece 30 in order to ensure fixed fiber orientation. Finally, FIG. 9, all of the remaining elements 46 are extended to engage segments 48 with diaphragms 14 and 16 and collapse them on fiber workpiece 30 in order to push the resin laterally. Some resins are available with very low viscosities (1-100 cps), which are waterlike, and it is possible to impregnate the fabric simply and very inexpensively by drawing or sucking the resin through the fabric by applying a vacuum on one end.

Figure 10:
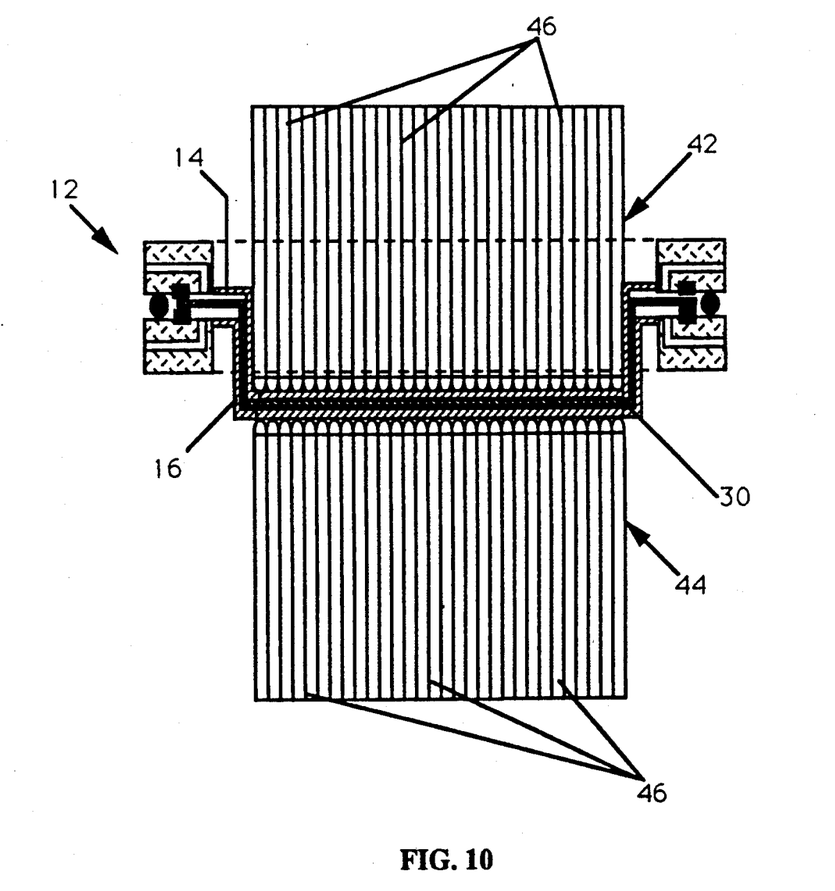
FIG. 10 is a side elevational schematic cross-sectional view showing the sealed chamber containing the fiber workpiece with the pins moved to a position at a preliminary forming position.
Figure 11:
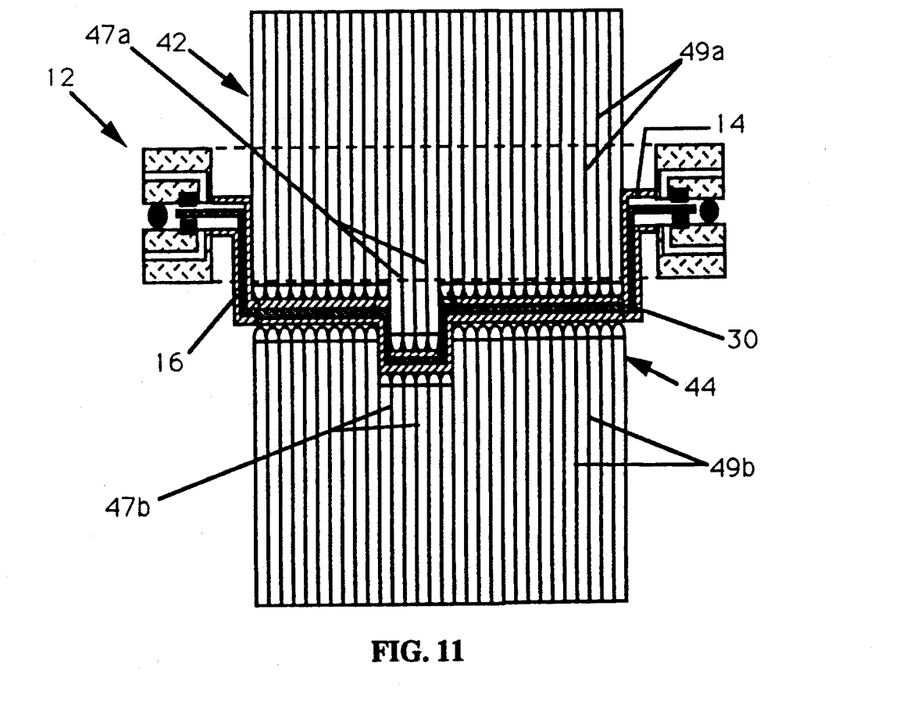
FIG. 11 is a view similar to FIG. 10 with the segmented portions of the press and die in the final position.
Figure 12:
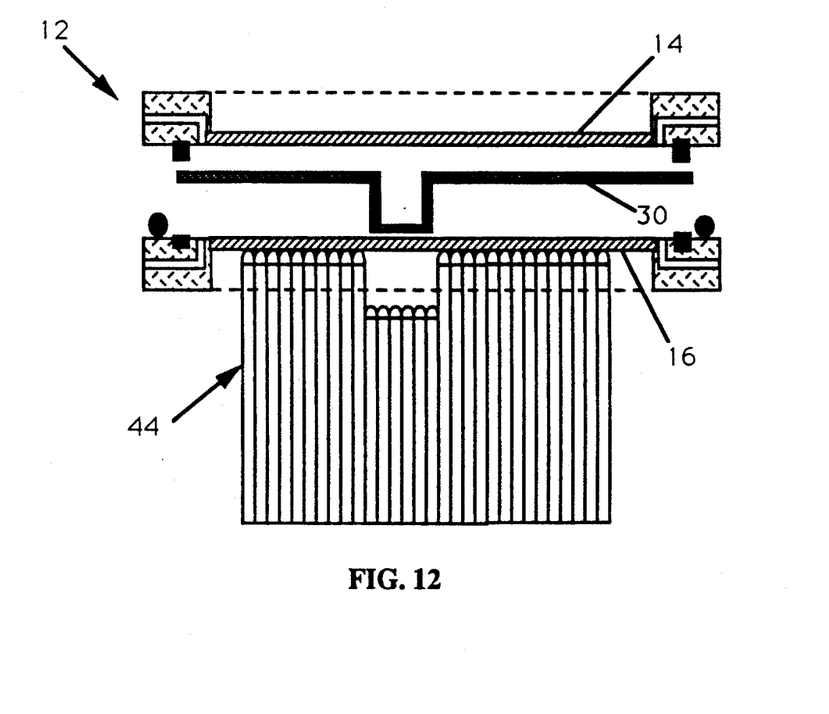
FIG. 12 is a view similar to FIG. 11 with the press retracted and the finished formed workpiece resting in the die.

In the forming operation, elements 46 may be operated to first preform fiber workpiece 30 in an initial step, FIG. 10, and then further form it in the final step, FIG. 11, by moving selected elements 47a and 49a downward and elements 47b and 49b upward. Following this the resin is cured, the upper tool 42 is retracted, FIG. 12, and the upper diaphragm 14 can be removed to gain access and remove the finished part 30.

Although thus far the reconfigurable press and die apparatus has been shown utilizing a multiplicity of pins, this is not a necessary limitation of the invention. For example, the upper and lower tools 42a and 42b, FIG. 13, may be sliced into a few elements 100, 102, having only a few surface segments 104, 106. Using fewer actuators and surface segments is beneficial when there are only a few contours that need to be shaped, and the multiplicity of pins pictured in FIGS. 1-4 would be unnecessary.

Figure 13:
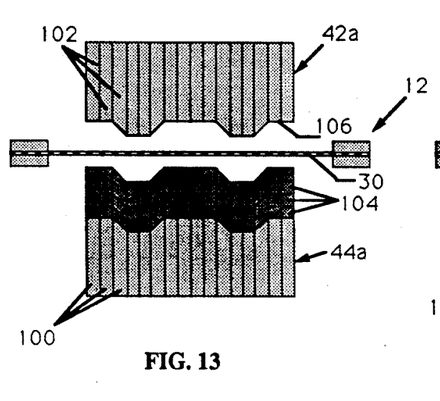
FIG. 13 is a cross-sectional view of a sliced press and die according to this invention prior to engaging the fiber workpiece.
Figure 14:
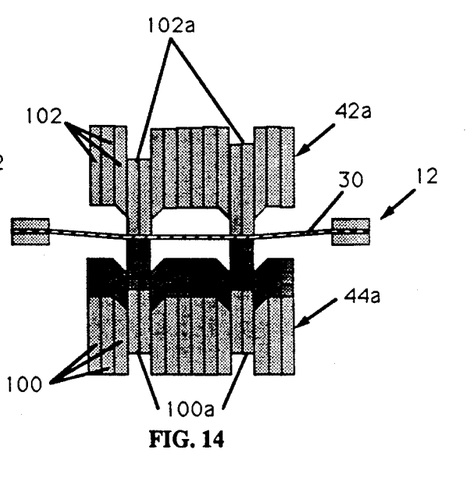
FIG. 14 is a view similar to FIG. 13 with selected portions of the press and die actuated to grip the workpiece.

In the initial forming step, FIG. 14, using the device of FIG. 13, only certain elements 102 are actuated in conjunction with certain elements 100.

Figure 15:
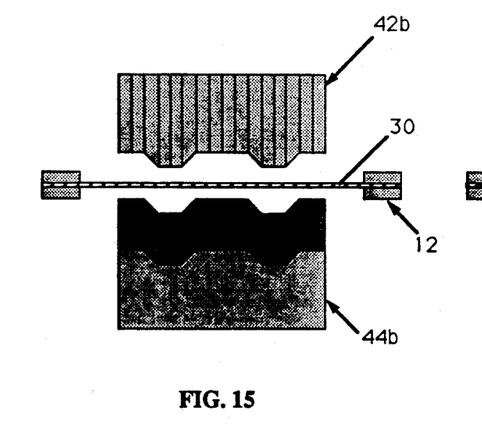
FIG. 15 is a view similar to FIG. 13 where only the upper portion of the mold or press is sectioned for independent action.
Figure 16:
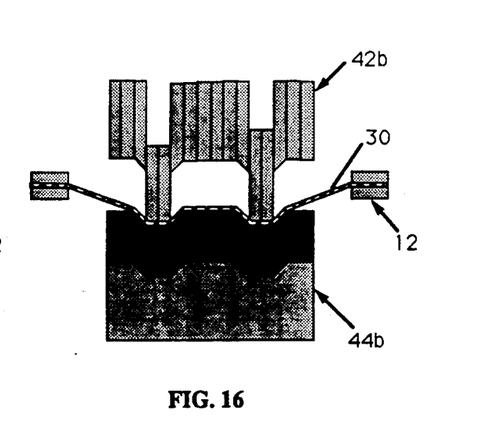
FIG. 16 is a view similar to FIG. 15 showing selected portions of the press or upper tool surface actuated to form the fiber workpiece against the die or lower tool surface.

Although thus far both the upper and lower tools 42 and 44 have been shown as comprising a plurality of elements, this is not a necessary limitation of the invention. Only one of the tools may be so segmented. For example, as shown in FIG. 15, upper tool 42b is segmented while the lower tool 44b is solid. Operation would occur in the same way as with respect to FIG. 14, except that there would be no movement, of course, in the lower tool 44b, FIG. 16. The lower tool can be made with a low-cost process, from wood as plastic, since there are no high pressures involved in filling the mold when vacuum impregnation is used.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A reconfigurable fiber-forming resin transfer molding system comprising:
   a chamber including opposing flexible first and second spaced diaphragms, means for sealingly engaging the edges of the diaphragms, means for disposing an initially generally planar fiber workpiece between the diaphragms dividing the chamber into two sections, and means for introducing into at least one section a resin for impregnating said workpiece; and
   press and die means surrounding said chamber for embracing said chamber and forming a contained workpiece to conform to the shape of the press and die.

2. The reconfigurable fiber-forming resin transfer molding system of claim 1 in which said means for sealingly engaging includes a first frame for mounting said first diaphragm and a second frame for mounting said second diaphragm.

3. The reconfigurable fiber-forming resin transfer molding system of claim 2 in which said means for sealingly engaging further includes a peripheral seal between said frames.

4. The reconfigurable fiber-forming resin transfer molding system of claim 1 in which said chamber further includes clamping means for tensioning said fabric workpiece in said chamber.

5. The reconfigurable fiber-forming resin transfer molding system of claim 1 in which said press and die means includes a reconfigurable press and die apparatus, at least one of said press and die including a plurality of mold surface segments.

6. The reconfigurable fiber-forming resin transfer molding system of claim 5 in which said Press and die means includes means for individually and selectively actuating said segments to configure a predetermined shape.

7. The reconfigurable fiber-forming resin transfer molding system of claim 5 in which both the press and die portion of said press and die apparatus include a plurality of mold surface segments.

8. The reconfigurable fiber-forming resin transfer molding system of claim 7 in which said press and die means includes means for individually and selectively actuating said segments to configure a predetermined shape.

* * * * *